US011099622B2

(12) United States Patent
Hamlin et al.

(10) Patent No.: US 11,099,622 B2
(45) Date of Patent: Aug. 24, 2021

(54) RESPONSE TIME FOR MOBILE IHS BAG REMOVAL

(71) Applicant: Dell Products, L.P., Round Rock, TX (US)

(72) Inventors: Daniel L. Hamlin, Round Rock, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 58 days.

(21) Appl. No.: 16/589,842

(22) Filed: Oct. 1, 2019

(65) Prior Publication Data
US 2021/0096630 A1 Apr. 1, 2021

(51) Int. Cl.
*G06F 1/3203* (2019.01)
*G06F 1/3231* (2019.01)

(52) U.S. Cl.
CPC .................. *G06F 1/3231* (2013.01)

(58) Field of Classification Search
CPC ..................................................... G06F 1/3203
USPC ........................................................ 713/320
See application file for complete search history.

(56) References Cited

U.S. PATENT DOCUMENTS

| 8,560,873 | B1* | 10/2013 | Sosa | G06F 1/3246 |
| | | | | 713/323 |
| 2006/0230294 | A1* | 10/2006 | Chaiken | G06F 1/203 |
| | | | | 713/300 |
| 2015/0102995 | A1* | 4/2015 | Shen | G06F 1/3231 |
| | | | | 345/156 |
| 2015/0220131 | A1* | 8/2015 | Johansson | G06F 1/3206 |
| | | | | 713/323 |
| 2016/0098076 | A1* | 4/2016 | Chng | G06F 1/3231 |
| | | | | 713/323 |
| 2020/0326767 | A1* | 10/2020 | Iyer | G06F 1/1677 |

\* cited by examiner

*Primary Examiner* — Suresh Suryawanshi
(74) *Attorney, Agent, or Firm* — Fogarty LLP

(57) ABSTRACT

An IHS Handling System (IHS) may be transported within various types of bags. Upon reaching a new location, a user removes the IHS from the bag and prefers that the IHS is ready for use as quickly as possible. Embodiments reduce response times of an IHS that is transported within a bag. While the IHS is configured in a standby power state, sensor readings are collected from sensors of the IHS. Based on the collected sensor readings, a first likelihood is determined of whether the IHS is located in a computer bag. Further based on the collected sensor readings, a second likelihood is determined of whether the IHS will be removed from the computer bag. The IHS is woken from the standby power state and configured for use based on the first likelihood or the second likelihood.

20 Claims, 5 Drawing Sheets

RESPONSE TIME FOR MOBILE IHS BAG REMOVAL

FIELD

This disclosure relates generally to mobile Information Handling Systems (IHSs), and more specifically, to initializing mobile IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Various types of mobile IHSs are presently in use, including laptop computers, hybrid laptops that support multiple different physical configurations, tablet computers and smartphones. Some of these mobile IHSs may be transported by users via a bag. In some cases, mobile IHSs may be transported in this manner on a regular basis. The bags used to transport IHSs include a wide variety of bags such as shoulder bags, purses, backpacks, attaché cases, briefcases and hard cases. In many instances, a user regularly transports a mobile IHSs between a small number of locations, such as between their home and one or more work locations. In some scenarios, a user removes a mobile IHSs from a bag immediately upon reaching a new location. In other scenarios, upon reaching a new location, a user does not remove a mobile IHS from its bag for varying amounts of time that may range from minutes to hours. At some time after removing a mobile IHS from its bag, the user may initialize the mobile IHS in order to begin use of the mobile IHS. Once a user has initialized the IHS, the user typically prefers that the IHS be ready for use as quickly as possible.

SUMMARY

In various embodiments, a method is provided for reducing response times of an IHS Handling System (IHS). The method includes: collecting sensor readings from a plurality of sensors of the IHS while the IHS is configured in a standby power state; determining, based on the collected sensor readings, a first likelihood of whether the IHS is located in a computer bag; determining, based on the collected sensor readings, a second likelihood of whether the IHS will be removed from the computer bag; and waking the IHS from the standby power state based on the first likelihood or the second likelihood.

In additional method embodiments, the plurality of sensors comprise one or more sensors configured to detect movement of the IHS. In additional embodiments, a method further includes collecting network signal information from a network interface of the IHS while the IHS is configured in the standby power state, wherein the second likelihood of whether the user will remove the IHS from the computer bag is further determined based on the collected network signal information. In additional method embodiments, the plurality of sensors comprise one or more line of sight sensors configured to detect proximity of a user to the IHS. In additional method embodiments, the plurality of sensors comprise one or more light sensors configured to detect an ambient light level. In additional embodiments, the method further includes: detecting a wake indication from a user within a first time duration of waking the IHS from the standby power state; and reverting the IHS to the standby power state if the wake indication is not detected within the first time duration. In additional embodiments, the method further includes the second likelihood of whether a user will remove the IHS from the computer bag is further determined based on a schedule associated with a user of the IHS. In additional embodiments, the method further includes determining a location of the IHS based on the collected network signal information, wherein waking the IHS from the standby power state comprises initializing the IHS for use at the determined location. In additional embodiments, the method further includes waking the IHS from the standby power state comprises coupling the IHS to a network.

In various additional embodiments, an Information Handling System (IHS), includes: a plurality of sensors; and a logic unit configured to operate while the mobile IHS is configured in a standby power state to execute instructions causing the logic unit to: collect sensor readings from the plurality of sensors; determine, based on the collected sensor readings, a first likelihood of whether the IHS is located in a computer bag; determine, based on the collected sensor readings, a second likelihood of whether the IHS will be removed from the computer bag; and generate a wake signal indication for waking the IHS from the standby power state based on the first likelihood or the second likelihood.

In additional IHS embodiments, the plurality of sensors comprise at least one of: sensors configured to detect movement of the IHS; light sensors configured to detect an ambient light level; and line of sight sensors configured to detect proximity of a user to the IHS. In additional IHS embodiments, the logic unit is further configured to operate while the mobile IHS is configured in a standby power state to execute instructions causing the logic unit to: receive network signal information collected from a network interface of the IHS while the IHS is configured in the standby power state, wherein the second likelihood of whether the user will remove the IHS from the computer bag is further determined based on the collected network signal information. In additional IHS embodiments, the logic unit is further configured to operate while the mobile IHS is configured in a standby power state to execute instructions causing the logic unit to: detect a wake indication from a user within a first time duration of waking the IHS from the standby power state; and revert the IHS to the standby power state if the wake indication is not detected within the first time duration. In additional IHS embodiments, the second likelihood of whether a user will remove the IHS from the computer bag is further determined based on a schedule associated with a user of the IHS. In additional IHS embodiments, waking the IHS from the standby power state further comprises coupling the IHS to a network.

In various additional embodiments, a computer-readable storage device includes instructions stored thereon for reducing response times of an IHS Handling System (IHS) configured in a standby power mode. Upon execution by one or more processors, the instructions cause the one or more processors to: collect sensor readings from a plurality of sensors of the IHS; determine, based on the collected sensor readings, a likelihood of whether the IHS is in transport to a scheduled event; and generate, based on the likelihood, a wake signal indication for waking the IHS from the standby power state.

In additional storage device embodiments, the plurality of sensors comprise at least one of: sensors configured to detect movement of the IHS; light sensors configured to detect an ambient light level; and line of sight sensors configured to detect proximity of a user to the IHS. In additional storage device embodiments, the program instructions further causing the one or more processors to: receive network signal information collected from a network interface of the IHS while the IHS is configured in the standby power state, wherein the likelihood of whether the IHS is in transport to a scheduled event is further determined based on the collected network signal information. In additional storage device embodiments, the likelihood of whether of whether the IHS is in transport to a scheduled event is determined based on a schedule associated with a user of the IHS. In additional storage device embodiments, the likelihood of whether of whether the IHS is in transport to a scheduled event is further determined based on movement data in the collected sensor readings.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
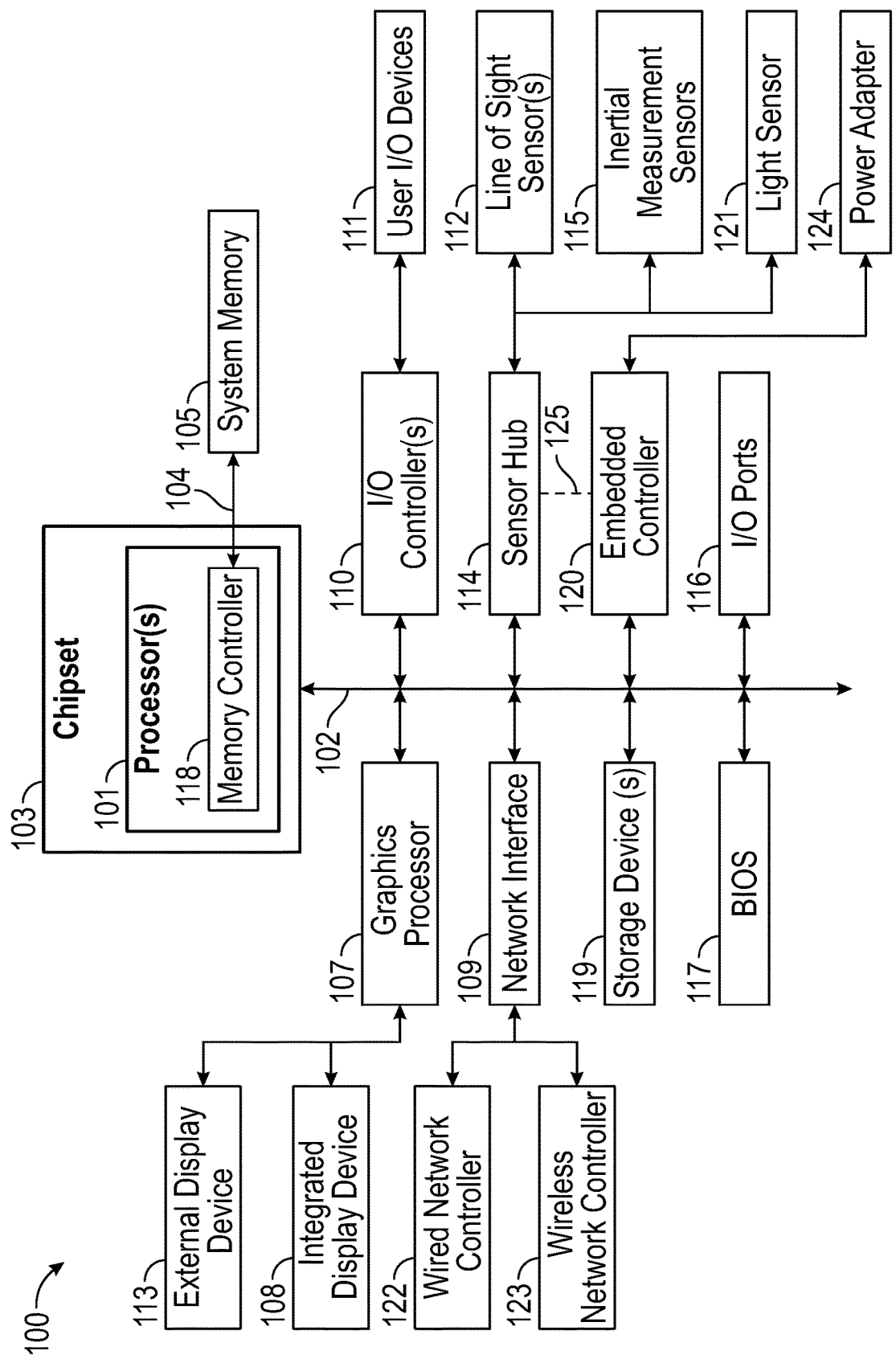
FIG. 1 is a block diagram depicting certain components of a mobile IHS configured according to various embodiments for supporting improved response times for removal of the mobile IHS from a bag.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, a user may transport a mobile IHS 100 between various locations. Upon reaching a new location, the user will remove the mobile IHS 100 from its bag and begin use of the mobile IHS 100. In some scenarios, a user will commence immediate operation of the mobile IHS 100 and thus prefers that the IHS 100 be ready for use as quickly as possible after the IHS 100 has been removed from the bag. In other scenarios, the user may delay removing the mobile IHS 100 from the bag prior to initiating use of the IHS. However, once the user is ready to begin use of the mobile IHS 100, the user will typically nonetheless prefer that the IHS ready for use as quickly as possible.

FIG. 1 is a block diagram illustrating certain components of a mobile IHS 100 configured according to certain embodiments for supporting improved response times for removal of the mobile IHS 100 from a bag. In various embodiments, mobile IHS 100 may include an embedded controller 120 and a sensor hub 114 that may each execute program instructions that cause each of these components to perform certain of the operations disclosed herein. In certain embodiments, mobile IHS 100 may be configured as a member of an enterprise network by which a variety of computing services may be provided to IHS 100.

Mobile IHS 100 includes one or more processors 101, such as a Central Processing Unit (CPU), that execute code retrieved from a system memory 105. Although mobile IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

Mobile IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, mobile IHS 100 may include one or more I/O ports 116 that each support removeable couplings with various types of peripheral external devices. For instance, I/O 116 ports may include USB (Universal Serial Bus) ports, by which a variety of external devices may be coupled to mobile IHS 100. I/O ports 116 may include various types of physical I/O ports accessible to a user via the enclosure of the mobile IHS 100, where these physical I/O ports support couplings that may connect mobile IHS 100 with external devices and systems, such as couplings established with USB compatible devices via USB ports supported by mobile IHS 100.

As illustrated, mobile IHS 100 may include a network interface 109 that may support different types of network connectivity. In certain embodiments, mobile IHS 100 may include one or more Network Interface Controllers (NIC), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of mobile IHS 100 in supporting different types of network connectivity, such as the network connectivity utilized by the operating system of mobile IHS 100.

Chipset 103 may also provide access to one or more display device(s) 108, 113 via graphics processor 107. In certain embodiments, graphics processor 107 may be comprised within a video card, graphics card or within an embedded controller installed within mobile IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to mobile IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of mobile IHS 100 accessed via bus 102. In some embodiments, power to graphics processor 107, integrated display device 108 and/or external display 133 may be turned off, or configured to operate at minimal power levels, in response to mobile IHS 100 entering a low-power state. As illustrated, mobile IHS 100 may support an integrated display device 108, such as a display integrated into a laptop, tablet, 2-in-1 convertible device, or mobile device. Mobile IHS 100 may also support use of one or more external displays 113, such as external monitors that may be coupled to mobile IHS 100 via various types of couplings, such as by connecting a cable from the external display 113 to an external I/O port 116 of the mobile IHS 100.

Chipset 103 also provides processor 101 with access to one or more storage devices 119. In various embodiments, storage device 119 may be integral to the mobile IHS 100, or may be external to the mobile IHS 100. In certain embodiments, storage device 119 may be accessed via a storage controller that may be an integrated component of the storage device. Storage device 119 may be implemented using any memory technology allowing mobile IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, mobile IHS 100 also includes a BIOS (Basic Input/Output System) 117 that may be stored in a non-volatile memory accessible by chipset 103 via bus 102. Upon powering or restarting mobile IHS 100, processor(s) 101 may utilize BIOS 117 instructions to initialize and test hardware components coupled to the IHS 100. The BIOS 117 instructions may also load an operating system for use by the mobile IHS 100. The BIOS 117 provides an abstraction layer that allows the operating system to interface with the hardware components of the mobile IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In certain embodiments, mobile IHS 100 may utilize one or more I/O controllers 110 that may each support hardware components such as user I/O devices 111. For instance, I/O controller 110 may provide access to one or more user I/O devices 110 such as a keyboard, mouse, touchpad, touchscreen, microphone, speakers, camera and other input and output devices that may be coupled to mobile IHS 100. Each of the supported user I/O devices 111 may interface with the I/O controller 110 through wired or wireless connections.

As illustrated, certain mobile IHS 100 embodiments may utilize a sensor hub 114 capable of determining the relative orientation and movement of the mobile IHS 100. For instance, sensor hub 114 may utilize inertial movement sensors 115, that may include accelerometer, gyroscope and/or magnetometer sensors. Such sensors 115 provide information that may be used by the sensor hub 115 in determining the current orientation and movement of mobile IHS 100 (e.g., mobile IHS 100 is motionless on a relatively flat surface or mobile IHS 100 is being moved irregularly and is likely in transport). As described in additional detail below, such movement and orientation information may be utilized to determine likelihoods of whether mobile IHS 100 is in a bag, is in transport within a bag and/or is being moved in a manner indicating the user will likely be removing the mobile IHS 100 from its bag in the near future.

In certain embodiments, sensor hub 114 may also include capabilities for determining a location and movement of mobile IHS 100 based on triangulation of network signals and based on network information provided by the operating system, by a network interface 109 and/or by embedded controller 120. As described in additional detail below, network information may be utilized in determining whether the current location of mobile IHS 100 corresponds to a known location, such as work or home location, where mobile IHS 100 has been previously used and is configured for use in a wireless network provided for use at that location. Upon anticipating removal of mobile IHS 100 from a bag at a known wireless network location, certain embodiments may configure mobile IHS 100 for use of the recognized wireless network as soon as removal of mobile of the IHS 100 is anticipated and, in some scenarios, prior to mobile IHS 100 being removed from its bag.

In some embodiments, sensor hub 114 may support various types of line of sight sensors 112, such as optical, infrared and sonar sensors. The information collected by such line of sight sensors 112 may be used by sensor hub 114 to detect indications of a user's presence near mobile IHS 100. In certain scenarios, such line of sight sensors 112 may additionally provide support for xR (virtual, augmented, mixed reality) sessions hosted by the mobile IHS 100. As illustrated, mobile IHS 100 may include one or more light sensors 121 that may include photo sensors and photoelectric sensors. Unlike the line of sight sensors 112, the light sensors 121 may be passive sensors that detect ambient light and, in some instances, convert the captured light into an electrical signal. Based on information collected by light sensors 121, determinations may be made regarding whether mobile IHS 100 is located in a bag. If the light sensors 121 indicate mobile IHS 100 has been removed from its bag and the user is detected in close proximity to the mobile IHS 100, embodiments may be configured to initialize and restore full power operations to mobile IHS 100 as quickly as possible. As described in additional detail below, along with the movement and orientation from the inertial movement sensors 115, the information collected by line of sight sensors 112, network information and/or light sensors 121 may be further utilized in various manners to determine likelihoods of whether mobile IHS 100 is in a bag, is in transport within bag and/or is being moved in a manner indicating the user will soon be removing the mobile IHS 100 from a bag.

In certain embodiments, sensor hub 114 may be an independent microcontroller or other logic unit that is coupled to the motherboard of mobile IHS 100. In such embodiments, sensor hub 114 may communicate with various sensors and chipset 103 of processor 101 via a bus connection such as an Inter-Integrated Circuit (I2C) bus or other suitable type of multi-master bus connection. In certain embodiments, sensor hub 114 may operate from a separate power plane from the main processors 101 and thus the operating system functions of mobile IHS 100. In certain embodiments, sensor hub 114 may be a component of an integrated system-on-chip incorporated into processor 101 and may utilize an I2C bus for communicating with sensors, such as the light sensors 121, inertial measurement sensors 115 and line of sight sensors 112. Sensor hub 114 may collect and processes data from such sensors using data fusion techniques in order to determine contextual information regarding the operational state of mobile IHS 100 for use in determining likelihoods of whether mobile IHS 100 is in a bag, in transport and/or is being moved in a manner indicating the user will soon be removing the mobile IHS 100 from a bag.

As illustrated, mobile IHS 100 embodiments may utilize an embedded controller 120 that may be a motherboard component of mobile IHS 100 and may include one or more logic units. Like the sensor hub 114, in certain embodiments, embedded controller 120 may operate from a separate power plane from the main processors 101 and thus the operating system functions of mobile IHS 100. Embedded controller 120 may also implement operations for interfacing with a power adapter 124 in managing power for mobile IHS 100. Such operations may be utilized to determine the power status of mobile IHS 100, such as whether mobile IHS 100 is operating from battery power or is plugged into an AC power source.

Firmware instructions utilized by embedded controller 120 may be used to operate a secure execution environment that may include operations for providing various core functions of mobile IHS 100, such as power management, management of operating modes in which IHS 100 may be physically configured (e.g., determining a mode of a convertible laptop IHS based on the current hinge angle of the IHS reported by sensor hub 114) and support for certain integrated I/O functions. The operations of the secure execution environment of embedded controller 120 may include operations describe herein for use in for supporting improved response times upon the mobile IHS 100 being removed from a bag. For instance, firmware of embedded controller 120 may include instructions that implement certain of the operations described with regard to sensor hub 114, such as interoperating with network controllers 122 and 123 and low-power operating system functions to collect network information while the mobile IHS 100 is in a standby power state and is being transported within a bag. In support of such configurations, in some embodiments, embedded controller 120 and sensor hub 114 may communicate during low-power states via an out-of-band signaling pathway 125 that allows the collection and processing of sensor inputs to be shared in various combinations between these two components.

Mobile IHS 100 may support the use of various power states. In some embodiments, the power states of a mobile IHS 100 may be implemented through operations of the embedded controller 120 and the operating system of the mobile IHS 100. In various embodiments, mobile IHS 100 may support various reduced power states in order to reduce power consumption and/or conserve battery power when mobile IHS 100 is not actively in use. The power states may include a fully on state in which the processor(s) 101 are fully powered, any storage devices 119 are powered and/or connected, any integrated displays 108 are fully powered, any previously configured network connections are initiated, and all other available components of mobile IHS 100 are also fully operational. In a fully off power state, processor(s) 101 are powered off, any integrated storage devices 119 are powered off and any remoted storage devices 119 are disconnected, any integrated displays 108 are powered off, network connections are disconnected, and power to all other components of mobile IHS 100 is off.

In an intermediate reduced-power state, various components of mobile IHS 100 may be powered down, but mobile IHS 100 remains ready for near-immediate use. For instance, in certain intermediate reduced-power states, processor(s) 101 remain powered, network connections remain connected, local and remote storage 119 remain powered and/or connected. However, in such reduced-power states certain components of mobile IHS 100 may be powered down, including integrated displays 108, output to any external displays 113, and certain peripheral devices coupled to mobile IHS 100. In various embodiments, different combinations of devices and resources may be powered and available during different reduced-power states.

In another intermediate low-power state, that may be referred to as a standby power state, sleep state or hibernation state, various types of state information may be stored to storage devices 119 and all but a selected set of components and low-power functions of mobile IHS 100 are shut down. For instance, the main components of the operating system may be shut down, processor(s) 101 may be powered down, storage devices 119 are powered down and/or disconnected, any integrated displays 108 are powered down and connections to external displays 113 are disconnected, and any network connections are disabled. However, in some embodiments, certain low-power operations may continue in this low-power state that may otherwise be indistinguishable from a fully off state to the user. As described, in certain embodiments, low-power functions operating during a standby power state may include operations performed by sensor hub 114 and/or embedded controller 120 that may be separately powered from processor(s) 101. In addition, in certain embodiments, processor(s) 101 may include a system-on-chip or other logic unit capability that may be separately powered from the processor core and used to implement certain low-power operations during a standby power state. In some embodiments, the operating system of mobile IHS 100 may support the operation of certain low-power functions using this low-power processing capability. For instance, such low-power functions may provide network information collected by network controllers 122, 123 using network scanning and may provide information regarding the user of the mobile IHS, such as scheduling and message information. As described in additional detail herein, such low-power, standby power state operations may be utilized to anticipate and detect removal of mobile IHS 100 from a bag and to configure mobile IHS 100 for immediate operation by a person removing the mobile IHS 100 from its bag.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
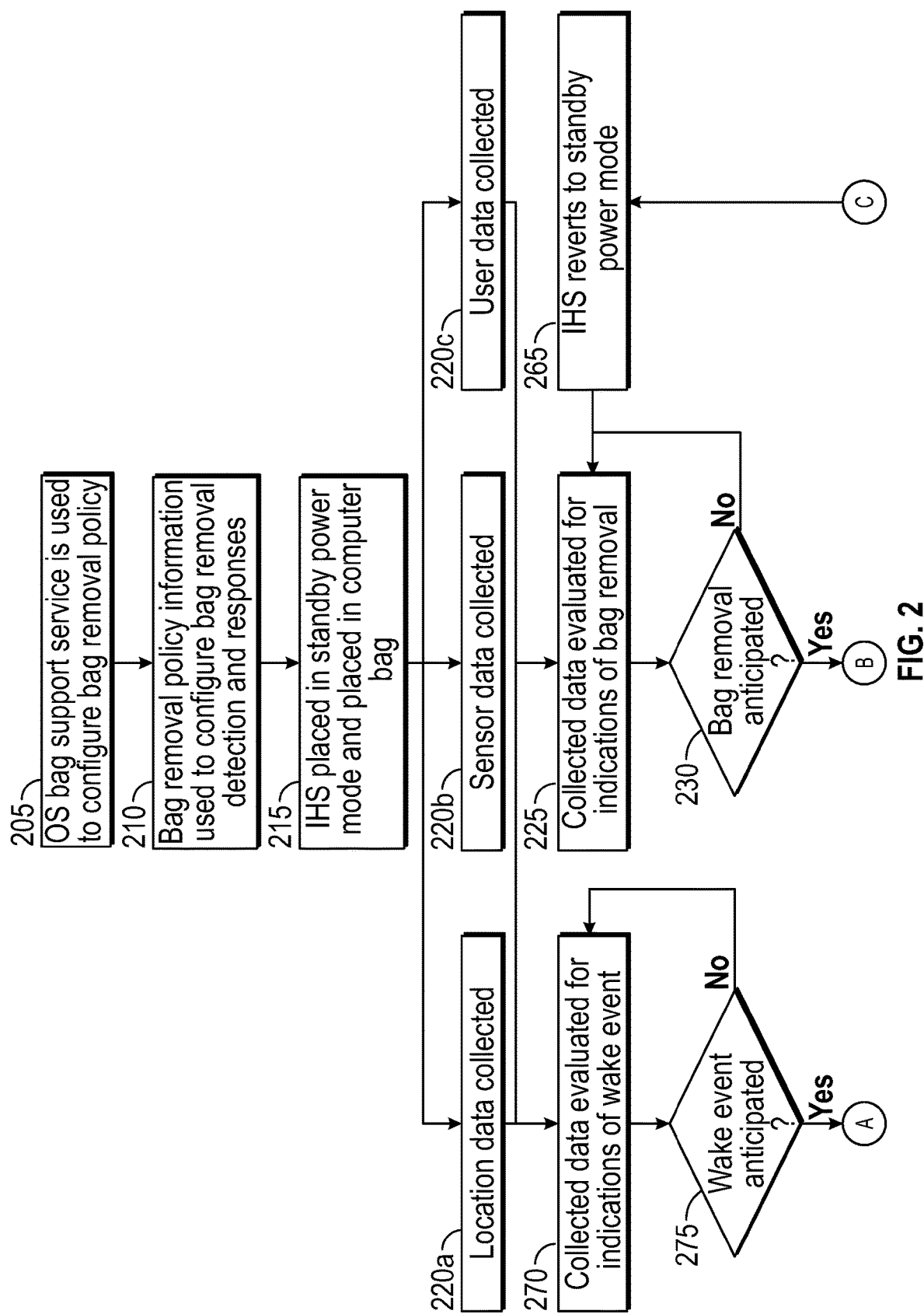
FIG. 2 is a flow chart diagram illustrating certain steps of a process according to various embodiments for supporting improved response times for removal of the mobile IHS from a bag.
Figure 2:
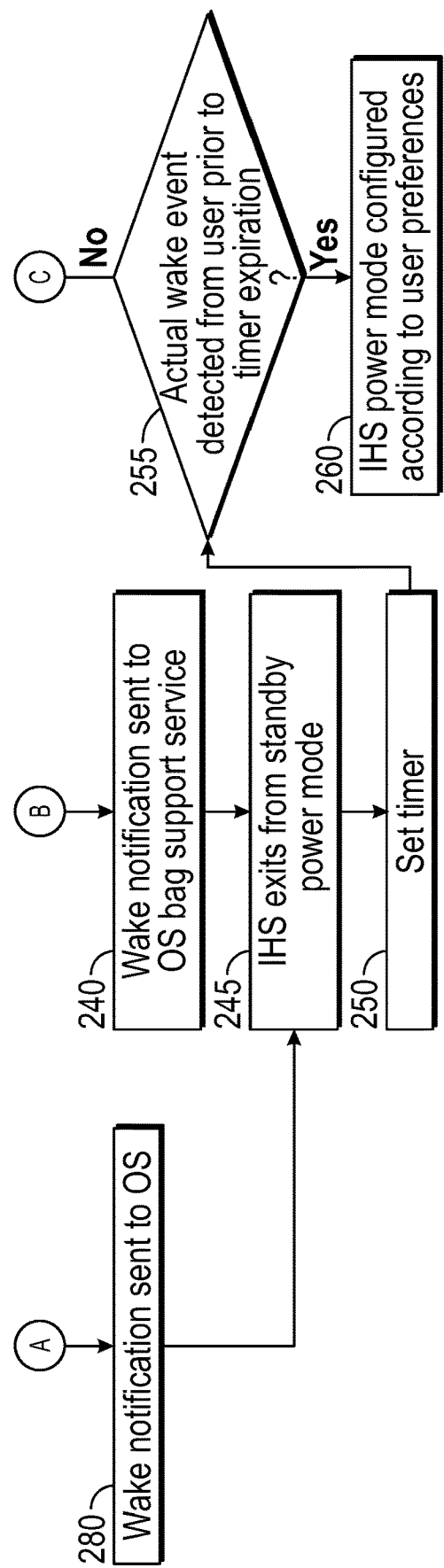

FIG. 2 is a flow chart diagram illustrating certain steps of a process according to various embodiments for supporting improved response times for removal of the mobile IHS from a bag, or upon detecting an upcoming wake event. As described, a mobile IHS such as a laptop computer may be placed within various types of bags for transport. Upon reaching a new location at which the user may resume use of the mobile IHS (such as an office, conference room, home, coffee shop, lobby, train, subway, bus, etc.), the user may remove the mobile IHS from its bag and proceed to initialize the mobile IHS, such as by pressing a designated button of the mobile IHS. The process of FIG. 4 provides users with improved response times that allow the users of embodiments to more quickly begin actual use of the mobile IHS upon reaching a new location.

Figure 3A:
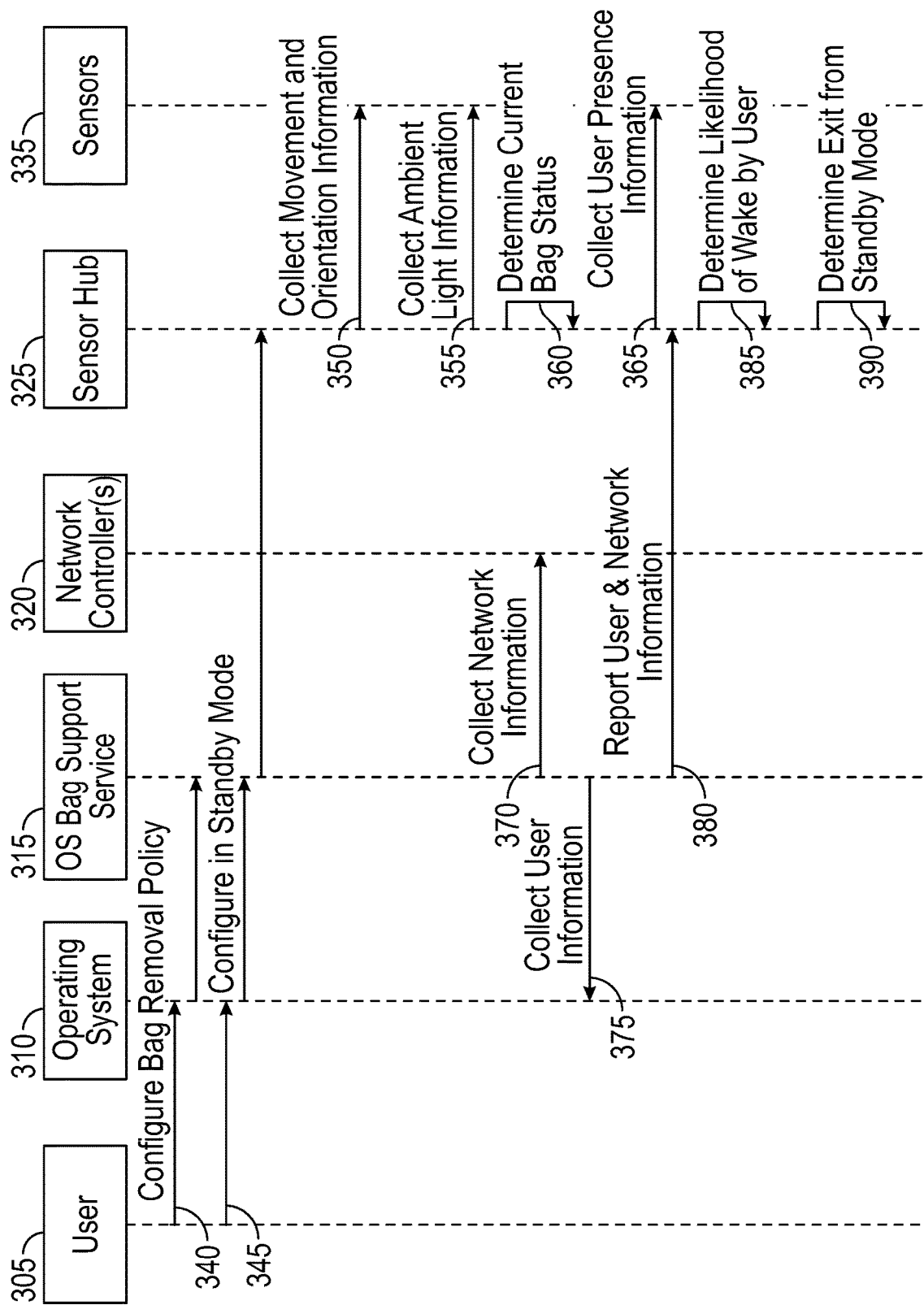
FIG. 3A is a sequence diagram illustrating certain responsibilities of components of an IHS configured according to certain embodiments for supporting improved response times for removal of the mobile IHS from a bag.
Figure 3B:
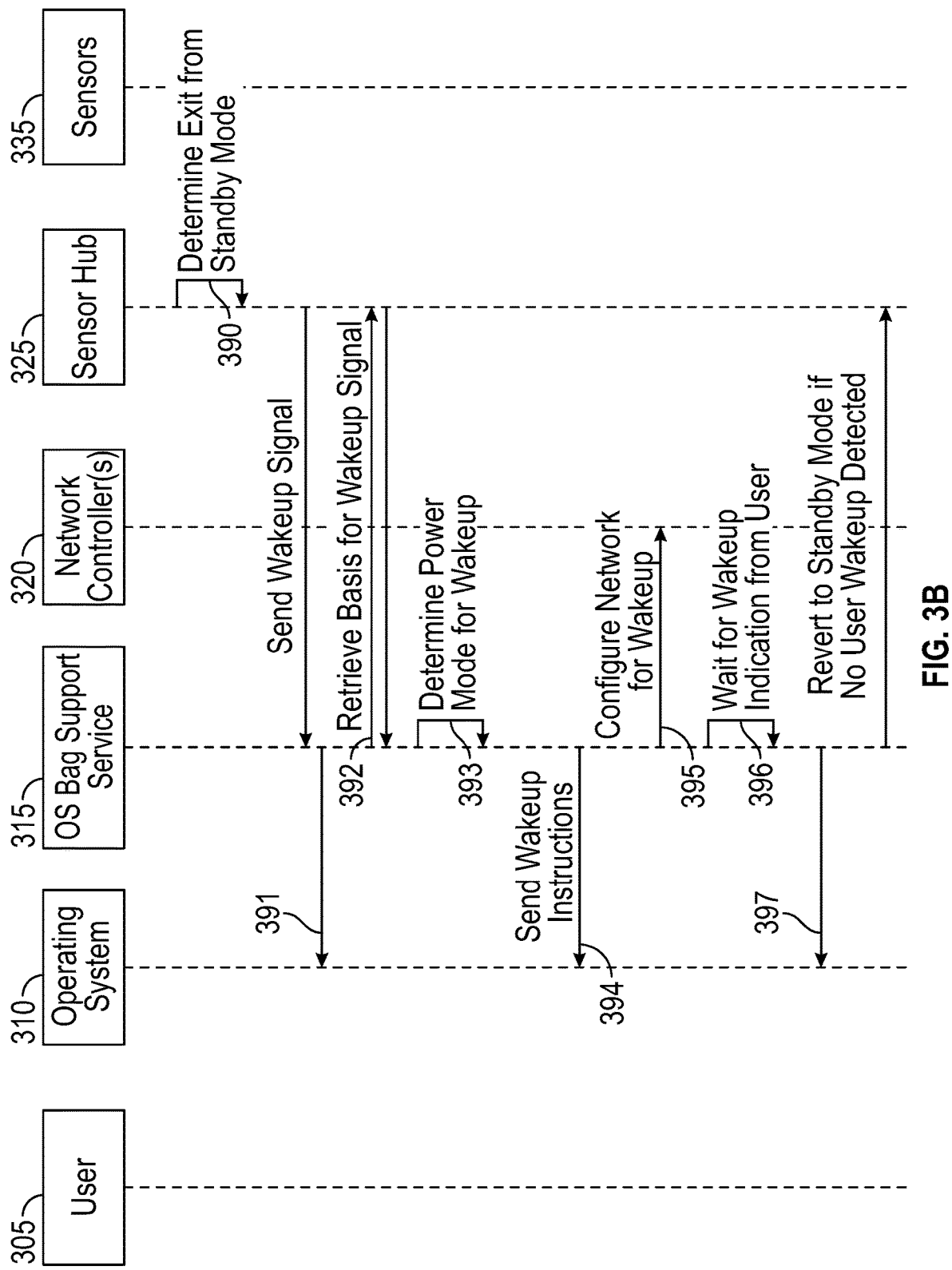
FIG. 3B is a sequence diagram illustrating certain additional responsibilities of components of an IHS configured according to certain embodiments for supporting improved response times for removal of the mobile IHS from a bag.

As described in additional detail with regard to FIGS. 3A-B, the described improvements to response times upon bag removal, or another anticipated wake event, may be supported by an IHS that operates using an operating system process that interfaces with the operating system and other components of the IHS in supporting standby mode operations used to anticipate and detect bag removal, or another anticipated wake event. In some embodiments, such an operating system process may support configuration of bag removal policies by users. Accordingly, at block 205, a user may be provided an interface for specifying various aspects of bag removal policies. For instance, a user may be asked to specify or confirm identified networks as being for home, work or public use. The user may be further asked to specify or confirm certain parameters to be used for waking the mobile IHS at different locations and/or at different types of locations. In certain instances, the user may be provided capabilities for specifying software applications and synchronization tasks to be initiated during different types of waking scenarios.

In embodiments where such user configurations are supported, at block 210, the bag removal policies are utilized to configure the operation of the bag support service in detecting bag removal scenarios and waking the mobile IHS. As described in additional detail with regard to FIG. 3, various components of the mobile IHS may interoperate in providing improved response times to bag removal or other wake events. Various aspects of the policies specified by the user may be used to configure the operations of each of these components of the mobile IHS. For instance, a bag removal policy may specify or confirm a wake-up scenario for use at a specific location, such as an office, cubicle or other work area. Accordingly, such policy information may be utilized to configure mobile IHS 100 for immediate use at a particular location upon anticipation of bag removable when arrival at this particular location is detected.

With the mobile IHS configured for use of the described bag support service, at block 215, the user places the mobile IHS in a standby power mode and places the mobile IHS within a carrying bag. As described with regard to FIG. 1, a mobile IHS according to embodiments may be configured to operate using various power states. In many scenarios, the user will configure the mobile IHS for operation in one of several low-power states that are appropriate for transporting the mobile IHS in a bag. In certain instances, the user may configure the mobile IHS in a standby power mode that may include a sleep mode, hibernation mode or power off mode prior to placing the mobile IHS in a bag. When placing the mobile IHS in standby power mode for transport, the user may be effectively turning the mobile IHS "off" with no ability to provide inputs or receive outputs until the mobile IHS is turned back "on." However, as described with regard to FIG. 1, various aspects of a mobile IHS may use available battery power to conduct certain low-power operations during standby power mode, even though the mobile IHS is effectively off from the perspective of the user.

While in this standby power mode, at blocks 220a-b, various low-power operations may be conducted to gather data used to anticipate and detect removal of the mobile IHS from its bag. As described with regard to FIG. 1, a mobile IHS may be configured with various types of sensors, including inertial movement sensors that may provide indications of movement of the mobile IHS and the orientation of the mobile IHS. At block 220b, such inertial movement sensors may be periodically queried in order to determine whether the mobile IHS is moving and its current physical orientation. For instance, based on such information, the mobile IHS may be determined to be experiencing intermittent or regular movement and may be positioned on its side, thus indicating the mobile IHS is being transported within a bag that is being carried as the user walks or uses a bicycle, scooter or other form of personal transport.

As described with regard to FIG. 1, a mobile IHS may also include a passive light sensor that can detect ambient light. In some embodiments, at block 220b, such light sensors may be queried to detect the ambient light that is reaching the mobile IHS. Based on readings collected from such light sensors, a mobile IHS may be determined to be located within a bag or outside of a bag. Importantly, light sensors may also provide an indication that the bag used to transport the mobile IHS is being opened, thus providing a reliable indication that user is preparing to remove the mobile IHS from the bag and commence operation of the mobile IHS.

In certain embodiments, predicting when mobile IHS is going to be removed from a bag may utilize information associated with the user of the mobile IHS. Such user information collected at block 220c via operations of the bag support service that runs within the operating system of the mobile IHS. In some embodiments, processes of the operating system that are configured to operate during standby power modes may be allowed to access certain user information, such as a schedule associated with the user. Based on such user schedule information, the confidence of a bag removal prediction may be increased. For instance, if bag removal is indicated based on movement information collected at block 220b, that bag removal indication may be confirmed if the user's schedule specifies that a scheduled appointment is approaching.

At block 220a, location information may be collected for use in predicting bag removal and preemptively waking and configuring the mobile IHS for use at a particular location. As described in additional detail with regard to FIGS. 3A-B, a bag support service running in the operating system may periodically query network interfaces supported by the mobile IHS. In this manner, the transport of the mobile IHS within range of known networks may be detected. For instance, such periodic querying of network information during transport of the mobile IHS in a power standby mode may indicate that the user is in range of a wireless home network. Upon detecting a bag removal indication in such a scenario, the mobile IHS may be configured to wake from the standby power mode and to preemptively connect to the wireless home network, along with various other initialization operations that support improve response time of the first operations likely to be used by the user upon reaching that location.

Using the location data, sensor data and user data collected at blocks 220a-c, at block 225, an evaluation may be made regarding whether the mobile IHS is located within a bag and/or whether the user is about to remove the mobile IHS from a bag. For instance, movement information collected at block 220b may indicate a period of ongoing movement of the mobile IHS has ended. If such a pattern of movement is detected and followed by the detection of a rapid increase in ambient light, removal of the mobile IHS from its bag may be predicted with a high degree of confidence. The confidence in such predictions may be further increased based on location information collected at block 220a, such as the detection of a private wireless network provided by the user's employer. In this manner, different combinations of inputs collected at blocks 220a-c may provide indications of a mobile IHS being removed from its bag.

Based on collected data, at block 230, a determination may be made regarding the likelihood that the mobile IHS is about to be removed from its bag. As described, the confidence of such determination may be based on the presence of multiple indications of a forthcoming bag removal. If no bag removal is indicated, or a low confidence bag removal prediction is generated, the periodic collection and evaluation of data continues. If a likelihood of bag removal above a specified threshold is determined, at block 240, a wake event may be signaled. In certain embodiments, a wake signal may be determined by a component of the mobile IHS, such as the sensor hub 114 or the embedded controller 120 of the mobile IHS 100 of FIG. 1, that is configured to operate while the mobile IHS is in a standby power mode. In such embodiments, a wake signal may be transmitted, at block 240, to the bag support service of the operating system in anticipation of the removal of mobile IHS from its bag.

As illustrated in FIG. 2, certain embodiments may be configured to also utilize location data, sensor data and user data collected at blocks 220a-c in identifying, at block 270, upcoming wake events while the mobile IHS is being transported, whether in a bag or carried in another form by the user, such as holding the mobile IHS in their hands. Similar to the described scenarios where a mobile IHS is transported in a bag, movement information collected at block 220b may indicate a period of ongoing movement of the mobile IHS while orientation information and light sensor information may indicate that mobile IHS is not being carried in a bag. Further sensor data collected at block 220b may provide an indication of the user's proximity to the IHS in a manner that suggests the user is carrying the mobile IHS. As described, user information collected at block 220a may include schedule information, where such schedule information may include the user's appointments and locations for such appointments. In such embodiments, schedule information may be evaluated to detect whether a user is moving the mobile IHS in order to participate in an approaching event. If such an event is identified while the mobile IHS is being transported, at block 275, the low-power operations of mobile IHS may determine that a wake event is anticipated. If an upcoming wake event is anticipated in this manner, at block 280, a wake signal may be transmitted to the operating system.

Upon receiving a wake signal indicating an anticipated bag removal or an anticipated wake event, at block 245, the mobile IHS may exit from the standby power mode. As described in additional detail with regard to FIGS. 3A-B, the mobile IHS may be configured to exit the standby power mode and to transition to one of several available power modes. For instance, if bag removal is predicted with a high degree of confidence, the mobile IHS may transition to a power mode that readies the mobile IHS for immediate use. However, if a lower confidence bag removal prediction is generated, the mobile IHS may transition to a power mode that initializes only certain functions of the mobile IHS, thus reducing the time required to complete the initialization of the mobile IHS. A power mode selected for a wake up may be similarly selected based on a level of confident in a wake event prediction that may be generated at block 275.

In some embodiments, the transition of the mobile IHS from standby power mode may also include initializing access to certain resources for immediate use upon the user commencing operation mobile IHS, where the resources that are initialized may depend on a level of confidence of a bag removal prediction and/or a wake event prediction. For instance, if a high confidence prediction is generated, the transition from standby power mode may include establishing a connection to an identified network and preemptively initiating certain synchronization procedures, such as sending and receiving messages. If a lower confidence prediction is generated, the processors and other components of the mobile IHS in standby mode may be powered, but attempts to connect the mobile IHS to external resources and data synchronizations may be deferred.

A mobile IHS according to embodiments may be configured to predict the removal of the mobile IHS from a carrying bag or another wake event and preemptively waking the mobile IHS in order to initialize certain functions of the mobile IHS in anticipation of its removal from a bag. Upon initiating preemptive wake up of the mobile IHS, at block 250, the bag support service of the operating system may initiate a timer for use in triggering a return to a standby power mode if no actual wake event from the user is detected. For instance, upon moving the mobile IHS from its bag, the user may signal a wake-up by pressing a power button of the mobile IHS. At block 255, the detection of an actual wake up signal prior to expiration of the timer is determined. If no actual wake-up signal is detected from the user, at block 265, the mobile IHS reverts to standby power mode and resumes evaluating collected data for indications of bag removal and/or a wake event from the user, such as the user approaching the mobile IHS after taking it out of its bag, placing it on a table and returning after some delay. If an actual wake-up signal is detected prior to expiration of the timer, at block 260, the mobile IHS completes any outstanding initializations and transitions to full power operations.

FIG. 3A is a sequence diagram illustrating certain responsibilities of components of an IHS configured according to certain embodiments for supporting improved response times for removal of the mobile IHS from a bag, or other types of wake events. As described with regard to FIG. 2, a bag support service 315 operating within the operating system 310 of mobile IHS may support an interface by which a user 305 may configure, at 340, various aspects of bag removal policies. For instance, the user 305 may be provided capabilities for configuring specific wake-up actions to be conducted in specific bag removal scenarios. For example, upon anticipating the bag removal at a public location, such as a subway system, the user may specify the use of a bag removal policy in which the mobile IHS is initialized and preemptively connects to the subway system wireless network. At 345, the user 305 configures the mobile IHS in standby power mode and places it in a bag for transport.

As described, while in standby power mode, some components of the mobile IHS, such as the main processors, memory, storage drives and displays, may be powered down. In such circumstances, the mobile IHS may be considered by the user to be in "off" state. Even though the mobile IHS is "off" from the user's perspective, certain low-power operations of mobile IHS may continue while configured in standby power mode. For instance, a sensor hub 325 of the mobile IHS may be configured to operate from a separate power plane from the main processors, thus allowing the sensor hub 325 to interface with one or more sensors 335 in order to collect sensor readings while the mobile IHS is in a standby power mode. At block 350, sensor hub 325 may receive movement and orientation information from the inertial movement sensors 335 supported by the mobile IHS. Such movement and orientation information may indicate whether the mobile IHS is located within a bag and/or is in transport. In certain scenarios, movement information may also support the ability to anticipate bag removal. For instance, a period of movement indicative of the mobile IHS being transported within a bag may be detected to cease after a duration that corresponds to the approximate duration of the user's daily commute, thus indicating that the user will soon remove the mobile IHS from its bag. At 355, sensor hub 325 may receive ambient light information from light sensors 335 supported by the mobile IHS. Such light information may provide a reliable indicator regarding whether the mobile IHS is currently within a bag or is in the process of being removed from a bag.

Based on the movement, orientation and ambient light information collected from sensors 335, at 360, sensor hub 325 may determine whether the mobile IHS is currently located within a bag, or a likelihood that the mobile IHS is currently located in a bag. In certain embodiments, sensor hub 325 may utilize additional sensor information to determine whether the mobile IHS is currently located within a bag. For instance, detecting the presence of a recognized public network, such as a wireless network supported by the user's automobile or a public transit system network, may provide additional indications that the mobile IHS is in transport and is thus likely to be in its bag, thus corroborating the collected movement, orientation and ambient light information. If indications of bag removal are detected in such a scenario, mobile IHS may be transitioned to an appropriate power state and connected to the recognized network. Embodiments may similarly utilize user information, such as a schedule associated with the user, in order to determine if the time at which a bag status determination is being generated corresponds to a time at which the user is normally commuting and not using the mobile IHS, or corresponds to the start time of meeting for which mobile IHS may preemptively initialized and configured.

As described with regard to FIG. 2, while the mobile IHS is determined to still be within its bag and no bag removal is anticipated, the available sensor data will be periodically collected and evaluated to determine if any changes are detected. In scenarios where removal of the mobile IHS from a bag has been detected or is anticipated, the collected sensor information to be further utilized to determine whether to signal a wake-up of the mobile IHS and to determine the appropriate wake-up policy to be used based on the collected data. Certain embodiments may collect data from various other sources in order to determine whether to signal a wake-up of the mobile IHS and to determine the wake-up policy to be utilized.

Upon detecting an anticipated or actual removal of the mobile IHS from a bag, at 365, the sensor hub 325 may query sensors 335, such as the line of sight sensors 112 described with regard to the mobile IHS 100 of FIG. 1, in order to detect the presence of a user in proximity to the mobile IHS. In in some scenarios, a user may remove a mobile IHS from its bag but may move away from where the mobile IHS is placed. In such scenarios, a wake event may be signaled with use of a wake-up policy that initializes the mobile IHS to a reduced low-power state that is quickly ready for use, but is not in a fully on state. In other scenarios, the user may remove a mobile IHS from its bag and collected sensor data may indicate the user remains in very close proximity to the mobile IHS. In such scenarios, a wake event may be signaled with use of a wake-up policy that initializes the mobile IHS to a full power state that is ready for immediate use.

As described, support for improved response time of the mobile IHS upon bag removal may be supported by a bag support service 315 that operates within the operating system 310 of the mobile IHS. In certain embodiments, the operating system 310 may support the operation of selected low-power functions that may operate while the mobile IHS is in a standby power mode. In such embodiments, the bag support service 315 may be configured to operate as one of the low-power functions operable during standby power mode. While operating during standby power mode, at 370, the bag support service 315 may collect network information from one or more wireless network controller interfaces 320 of the mobile IHS, such as a W-Fi or Bluetooth network controller. In certain embodiments, the bag support service

315 may periodically wake a network controller 320 in order to initiate a scan of available networks.

In certain embodiments, another low-power function of the bag support service 315 may include collecting, at 375, user data that is provided via the low-power functions of the operating system 310 that operate during standby power mode. For instance, schedule information may be available for a user. Such schedule information may include times and locations of appointments and events as well as daily schedule information, such as a regular commuting or travel schedule. At 380, the information collected during the low-power operations of the bag support service may be transmitted to the sensor hub 325 for use in further detecting and/or anticipating removal of the mobile IHS from a bag. As described, schedule information may be used to anticipate the end of a regular commute or of a trip to attend a scheduled meeting and to thus anticipate removal of the mobile IHS from its bag once collected movement, orientation, light and/or network information indicates that the user has reached a particular location. In this manner, at 385, the sensor hub 325 may evaluate the collected information to determine a likelihood that the user will wake the mobile IHS upon removing it from its bag. As described, in some embodiments, the collected information may alternatively or additionally evaluated to determine a likelihood that the mobile IHS is being transported to a location in order for the user to attend a scheduled event, thus providing a basis for a preemptive wake event. If the likelihood of a wake event from the user is above a certain threshold, at 390, the sensor hub 325 may signal, at block 390, a preemptive wake of the mobile IHS.

FIG. 3B is a sequence diagram illustrating certain additional responsibilities of components of an IHS configured according to certain embodiments for supporting improved response times for removal of the mobile IHS from a bag. In FIG. 3B, the process of preemptively waking a mobile IHS from a power standby mode of FIG. 3A continues with the determination, at 390, of a preemptive waking of the mobile IHS based on collected sensor, location and/or user information. As illustrated, at 391, the sensor hub 325 dispatches a wake-up signal to the bag support service 315 of the operating system 310. As described, preemptive waking of a mobile IHS may configure the mobile IHS in one of various available power states where the appropriate power state may be determined based on the conditions that triggered the preemptive waking determination. Accordingly, at 392, the bag support service 315 may query the sensor hub 325 for information regarding the basis for the wake-up determination. For instance, the wake-up signal may have been triggered by a recognized movement pattern in conjunction with the detection of a recognized network and the detection of the user in close proximity to the mobile IHS.

Based on the conditions resulting in the triggering of the wake-up signal, at 393, the bag support service 315 may determine the appropriate power mode for preemptively waking the mobile IHS. In certain embodiments, power modes may be specified via bag removal policies. For instance, a bag removal policy may specify waking the mobile IHS to full power operations and connecting to be recognized business network upon generating a high confidence bag removal prediction, detecting the user in close proximity to the mobile IHS, and detecting the wireless signal of this business network. In another scenario, a bag removal policy may specify waking the mobile IHS to a reduced-power mode upon detecting a lower confidence bag prediction based on ambient light data, but not detecting any additional indicators of anticipated use of the mobile IHS upon bag removal, such as detecting a recognized network or detecting user proximity.

Upon determining the appropriate parameters for preemptive wake-up, at 394, the bag support service 315 may communicate the wake-up parameters to the operating system 310. In response to receiving the wake-up signal, the operating system 310 may initiate certain aspects of the specified wake-up. For instance, the processors and other components of the mobile IHS may be powered and the operating system 310 of the mobile IHS may be fully initialized. In other wake-up scenarios, certain components of the mobile IHS may be powered without fully initializing the mobile IHS. As described, wake-up scenarios may also include preemptively connecting the mobile IHS to certain recognized wireless networks. Accordingly, at 395, the bag support service 315 may initiate connections by one or more network controllers 320 of the mobile IHS. In this same manner, the bag support service 315 may initiate connections to various network resources, such as remote storage capabilities, and may undertake certain synchronization, such as sending and receiving messages.

By preemptively waking the mobile IHS, the response time of the mobile IHS is improved when the user removes the mobile IHS from a bag and begins use of the mobile IHS. However, in certain scenarios, the mobile IHS may be preemptively woken, but the user may not actually begin use of IHS. Accordingly, upon preemptively waking the mobile IHS, at 396, the bag support service waits for an actual wake-up indication from the user prior to expiration of a timer, such as the user pressing a power button of the mobile IHS or the user commencing use of the initialized mobile IHS. If no wake-up indication is detected prior to expiration of the timer, at 397, the bag support service may generate a signal reverting the mobile IHS to a standby power mode. Since no actual wake-up indication has been detected, available battery power is conserved, no additional heat is generated, and the mobile IHS is reverted to a standby power state during which collected data may be evaluated, as described above, for indications of an anticipated wake event.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for reducing response times of an Information Handling System (IHS), the method comprising:
   collecting sensor readings from a plurality of sensors of the IHS while the IHS is configured in a standby power state, wherein the collected sensor readings comprise collected network signal information that identifies one or more networks;
   determining, based on the collected sensor readings, whether the IHS is being transported while the IHS is within in a computer bag;
   determining, based on the collected sensor readings, a confidence level regarding whether the IHS will be removed from the computer bag;
   when the confidence level is above a first threshold, waking the IHS from the standby power state to a power mode that prepares the IHS for immediate use, and
   when the confidence level is below the first threshold, waking the IHS from the standby power state to a power mode that reduces the time required to prepare the IHS for immediate use.

2. The method of claim 1, wherein the collected network signal information identifying one or more networks is used determine movement of the IHS indicating the IHS is being transported.

3. The method of claim 2, wherein the collected network signal information indicating the IHS is being transported identifies a first network associated with a form of transit utilized by the user of the IHS.

4. The method of claim 3, wherein the first network associated with a form of transit of the user comprises a network of an automobile utilized by the user.

5. The method of claim 1, wherein the plurality of sensors comprise one or more light sensors configured to detect an ambient light level, wherein detection of ambient light by the one or more light sensors increases the confidence level regarding whether the IHS will be removed from the computer bag.

6. The method of claim 1, wherein the confidence level regarding whether the IHS will be removed from the computer bag is increased when the collected network signal information identifies a recognized network.

7. The method of claim 6, wherein waking the IHS from the standby power state to a power mode that prepares the IHS for immediate use comprises connecting the IHS to the recognized network.

8. The method of claim 1, further comprising:
   determining a location of the IHS based on the collected network signal information, wherein waking the IHS from the standby power state to a power mode that prepares the IHS for immediate use comprises initializing the IHS for use at the determined location.

9. The method of claim 7, wherein waking the IHS from the standby power state to a power mode that prepares the IHS for immediate use comprises synchronization procedures that send and receive messages via the connection to the recognized network.

10. An Information Handling System (IHS), comprising:
    a plurality of sensors, comprising one or more network controllers that collect network signal information that identifies one or more networks; and
    a logic unit configured to operate while the mobile IHS is configured in a standby power state to execute instructions causing the logic unit to:
    collect sensor readings from the plurality of sensors;
    determine, based on the collected sensor readings, whether the IHS is being transported while the IHS is within a computer bag;
    determine, based on the collected sensor readings, a confidence level regarding whether the IHS will be removed from the computer bag;
    when the confidence level is above a first threshold, waking the IHS from the standby power state to a power mode that prepares the IHS for immediate use, and
    when the confidence level is below the first threshold, wake the IHS from the standby power state to a power mode that reduces the time required to prepare the IHS for immediate use.

11. The IHS of claim 10, wherein the plurality of sensors comprise one or more light sensors configured to detect an ambient light level, wherein detection of ambient light by the one or more light sensors increases the confidence level regarding whether the IHS will be removed from the computer bag.

12. The IHS of claim 10, wherein the collected network signal information indicating the IHS is being transported identifies a first network associated with a form of transit utilized by the user of the IHS.

13. The IHS of claim 10, wherein the confidence level regarding whether the IHS will be removed from the computer bag is increased when the collected network signal information identifies a recognized network.

14. The IHS of claim 13, wherein waking the IHS from the standby power state to a power mode that prepares the IHS for immediate use comprises connecting the IHS to the recognized network.

15. The IHS of claim 10, wherein waking the IHS from the standby power state to a power mode that prepares the IHS for immediate use comprises initializing the IHS for use at a location determined based on the collected network signal information.

16. A non-transitory computer-readable storage device having instructions stored thereon for reducing response times of an IHS Handling System (IHS) configured in a standby power mode, wherein upon execution by one or more processors, the instructions cause the one or more processors to:
  collect sensor readings from a plurality of sensors of the IHS, wherein the sensors comprise one or more network controllers that collect network signal information that identifies one or more networks;
  determine, based on the collected sensor readings, whether the IHS is being transported while the IHS is within a computer bag;
  determine, based on the collected sensor readings, a confidence level regarding whether the IHS will be removed from the computer bag;
  when the confidence level is above a first threshold, wake the IHS from the standby power state to a power mode that prepares the IHS for immediate use, and when the confidence level is below the first threshold, wake the IHS from the standby power state to a power mode that reduces the time required to prepare the IHS for immediate use.

17. The computer-readable storage device of claim 16, wherein the plurality of sensors comprise one or more light sensors configured to detect an ambient light level, wherein detection of ambient light by the one or more light sensors increases the confidence level regarding whether the IHS will be removed from the computer bag.

18. The computer-readable storage device of claim 16, wherein the collected network signal information indicating the IHS is being transported identifies a first network associated with a form of transit utilized by the user of the IHS.

19. The computer-readable storage device of claim 16, wherein the confidence level regarding whether the IHS will be removed from the computer bag is increased when the collected network signal information identifies a recognized network.

20. The computer-readable storage device of claim 19, wherein waking the IHS from the standby power state to a power mode that prepares the IHS for immediate use comprises connecting the IHS to the recognized network.

* * * * *